United States Patent
Solanki et al.

(10) Patent No.: US 12,231,407 B2
(45) Date of Patent: Feb. 18, 2025

(54) LOGICAL SWITCH LEVEL LOAD BALANCING OF L2VPN TRAFFIC

(71) Applicant: VMware LLC, Palo Alto, CA (US)

(72) Inventors: Deepika Solanki, Pune (IN); Yong Wang, San Jose, CA (US); Sarthak Ray, Pune (IN)

(73) Assignee: VMware LLC, Palo Alto, CA (US)

( * ) Notice: Subject to any disclaimer, the term of this patent is extended or adjusted under 35 U.S.C. 154(b) by 382 days.

(21) Appl. No.: 17/564,274

(22) Filed: Dec. 29, 2021

(65) Prior Publication Data

US 2023/0143157 A1  May 11, 2023

(30) Foreign Application Priority Data

Nov. 8, 2021  (IN) .............................. 202141051017

(51) Int. Cl.
*H04L 9/40*  (2022.01)

(52) U.S. Cl.
CPC ........ *H04L 63/029* (2013.01); *H04L 63/0428* (2013.01); *H04L 63/162* (2013.01)

(58) Field of Classification Search
CPC . H04L 63/029; H04L 63/0428; H04L 63/162; H04L 63/0272; H04L 63/164
See application file for complete search history.

(56) References Cited

U.S. PATENT DOCUMENTS

| | | | | |
|---|---|---|---|---|
| 6,823,462 B1 * | 11/2004 | Cheng | ................. | H04L 12/4641 709/227 |
| 7,376,743 B1 * | 5/2008 | Bazzinotti | ........... | H04L 67/1008 709/229 |
| 7,984,495 B1 * | 7/2011 | Aravind | .............. | H04L 12/4641 726/15 |
| 9,491,625 B2 * | 11/2016 | Jung | ...................... | H04W 12/08 |
| 10,516,652 B1 * | 12/2019 | Hashmi | ................. | H04L 63/061 |
| 10,924,274 B1 * | 2/2021 | Piriyath | ................ | H04L 67/104 |
| 2003/0135753 A1 * | 7/2003 | Batra | ...................... | H04L 63/20 726/14 |

(Continued)

FOREIGN PATENT DOCUMENTS

| | | | | |
|---|---|---|---|---|
| CN | 109639650 A | * | 4/2019 | ......... H04L 12/4633 |
| WO | WO-2022112646 A1 | * | 6/2022 | |

*Primary Examiner* — Michael R Vaughan
*Assistant Examiner* — Abdullah Almamun
(74) *Attorney, Agent, or Firm* — King Intellectual Asset Management

(57) ABSTRACT

The disclosure provides an approach for logical switch level load balancing of Layer 2 virtual private network (L2VPN) traffic. A method of securing communications with a peer gateway generally includes establishing, at a virtual tunnel interface of a local gateway, a plurality of security tunnels with the peer gateway. Each of the plurality of security tunnels is associated with a different set of one or more layer 2 segments and with one or more security associations (SAs) with the peer gateway. The method generally includes receiving a packet, at the local gateway, via a first L2 segment. The method generally includes selecting one of the plurality of security tunnels and an SA associated with the selected security tunnel based on the L2 segment via which the packet was received. The method generally includes encrypting and encapsulating the packet based on the selected security tunnel and SA.

20 Claims, 10 Drawing Sheets

600

| Hash | IPsec tunnel |
|---|---|
| Hash (L2 ID=A) | IPsec tunnel = 1 |
| Hash (L2 ID=B) | IPsec tunnel = 2 |
| Hash (L2 ID=C) | IPsec tunnel = 3 |
| Hash (L2 ID=D) | IPsec tunnel = 4 |
| ... | IPsec tunnel = n |

(56) References Cited

U.S. PATENT DOCUMENTS

| | | | |
|---|---|---|---|
| 2004/0090972 A1* | 5/2004 | Barrett | H04L 63/0272 370/401 |
| 2006/0105741 A1* | 5/2006 | Suh | H04W 12/04 455/410 |
| 2009/0122990 A1* | 5/2009 | Gundavelli | H04L 63/164 380/278 |
| 2013/0128751 A1* | 5/2013 | Keesara | H04L 41/0677 370/248 |
| 2013/0247134 A1* | 9/2013 | Puttaswamy Naga | H04L 63/0218 726/1 |
| 2013/0311778 A1* | 11/2013 | Cherukuri | H04L 67/1001 713/171 |
| 2016/0080502 A1* | 3/2016 | Yadav | H04L 45/38 709/227 |
| 2017/0054692 A1* | 2/2017 | Weis | H04L 63/0272 |
| 2017/0170987 A1* | 6/2017 | Kumar | H04L 47/193 |
| 2020/0403922 A1 | 12/2020 | Yu et al. | |
| 2021/0127269 A1* | 4/2021 | Gupta | H04L 63/061 |
| 2022/0279350 A1* | 9/2022 | Gupta | H04L 63/20 |

* cited by examiner

600

| Hash | IPsec tunnel |
|---|---|
| Hash (L2 ID=A) | IPsec tunnel = 1 |
| Hash (L2 ID=B) | IPsec tunnel = 2 |
| Hash (L2 ID=C) | IPsec tunnel = 3 |
| Hash (L2 ID=D) | IPsec tunnel = 4 |
| ... | IPsec tunnel = n |

| Hash | IPsec tunnel |
|---|---|
| Hash (L2 ID=A, VTI 209 ID) | IPsec tunnel = 1 |
| Hash (L2 ID=B, VTI 209 ID) | IPsec tunnel = 2 |
| Hash (L2 ID= A, VTI 711 ID) | IPsec tunnel = 3 |
| Hash (L2 ID=B, VTI 711 ID) | IPsec tunnel = 4 |

| Hash | IPsec tunnel |
|---|---|
| Hash (L2 ID=A, GRE source IP = X, GRE destination IP = Y) | SPI = 1 |
| Hash (L2 ID=B, GRE source IP = X, GRE destination IP = Y) | SPI = 2 |
| Hash (L2 ID=C, GRE source IP = X, GRE destination IP = Y) | SPI = 3 |
| Hash (L2 ID=D, GRE source IP = X, GRE destination IP = Y) | SPI = 4 |
| Hash (L2 ID=A, GRE source IP = W, GRE destination IP = Z) | SPI = 5 |
| ... | SPI = n |

FIG. 9

LOGICAL SWITCH LEVEL LOAD BALANCING OF L2VPN TRAFFIC

RELATED APPLICATION

Benefit is claimed under 35 U.S.C. 119(a)-(d) to Foreign Application Serial No. 202141051017 filed in India entitled "LOGICAL SWITCH LEVEL LOAD BALANCING OF L2VPN TRAFFIC", on Nov. 8, 2021, by VMware, Inc., which is herein incorporated in its entirety by reference for all purposes.

BACKGROUND

Software defined networking (SDN) may be used to create a software defined datacenter (SDDC). An SDDC involves a plurality of hosts in communication over a physical network infrastructure of a datacenter (e.g., an on-premise datacenter or a cloud datacenter). Each host has one or more virtualized endpoints such as virtual machines (VMs), containers, or other virtual computing instances (VCIs). These VCIs may be connected across the multiple hosts in a manner that is decoupled from the underlying physical network, which may be referred to as an underlay network. The VCIs may be connected to one or more logical overlay networks that may span multiple hosts. The underlying physical network and the one or more logical overlay networks may use different addressing. Though certain aspects herein may be described with respect to VMs, it should be noted that the techniques herein may similarly apply to other types of VCIs.

Any arbitrary set of VCIs in a datacenter may be placed in communication across a logical Layer 2 network by connecting them to a logical switch. A logical switch is collectively implemented by at least one virtual switch on each host that has a VCI connected to the logical switch. Virtual switches provide packet forwarding and networking capabilities to VCIs running on the host. The virtual switch on each host operates as a managed edge switch implemented in software by the hypervisor on each host.

A logical Layer 2 network infrastructure of a datacenter may be segmented into a number of Layer 2 (L2) segments, each L2 segment corresponding to a logical switch and the VCIs coupled to that logical switch. There may be different types of L2 segments, such as an overlay segment or virtual local area network (VLAN) segment. An L2 overlay segment may be identified by an identifier associated with the corresponding logical switch, such as a virtual network identifier (VNI), whereas a VLAN segment may be identified by a VLAN ID. A VLAN is a broadcast domain that is partitioned and isolated at Layer 2. Accordingly, VLANs can be used to segment a Layer 2 network to separate traffic between different VLANs. For example, different VCIs may be assigned different VLAN IDs corresponding to different VLANs.

A datacenter may implement a layer 2 virtual private network (L2VPN) to extend one or more L2 segments of the datacenter. Each L2 segment extended by the L2VPN may secure the connection using a security protocol such as an IP security (IPsec) protocol. IPsec protocols are widely used to protect packets communicated between endpoints, such as over the Internet, between gateways, between datacenters (e.g., on premises datacenters, cloud datacenters, etc.), within datacenters, etc. For example, the endpoints (e.g., VCIs, gateways, hosts, etc.) may be configured with IPsec protocols to engage in an internet key exchange (IKE) negotiation process to establish an IKE tunnel. An IKE tunnel allows for the endpoints to further establish an IPsec tunnel to provide security associations (SAs) between the endpoints. In some embodiments, each SA is a one-way or simplex connection and, therefore, at least two SAs are established between two endpoints-one for each direction. Endpoints with an IPsec tunnel established between them may also be referred to as IPsec peers. These SAs are a form of contract between the IPsec peers detailing how to exchange and protect information exchanged between the IPsec peers. In some embodiments, each SA uses a mutually agreed-upon key, one or more security protocols, and/or a security parameter index (SPI) value. Each IPsec peer has an IPsec virtual tunnel interface (VTI) that provides a routable interface for terminating IPsec tunnels. Packets transmitted through the VTI will be encrypted and sent through IPsec tunnel. Accordingly, after SAs have been established between two endpoints, an IPsec protocol may be used to protect data packets for transmission through the VTI.

In certain implementations, all L2VPN traffic between two endpoints is sent from a single VTI at the transmitting endpoint using a single IPsec tunnel and received using a single VTI at the receiving endpoint. This may cause processing inefficiencies at the receiving endpoint that processes received L2VPN traffic. For example, when a physical or virtual network interface card (NIC) on the receiving endpoint receives an encapsulated packet, the NIC computes a hash value based on one or more values in the packet's outer header. The NIC then places the packet in one of a plurality of processing queues based on the hash value. For example, the processing queues may be receive side scaling (RSS) queues. Each queue may be associated with a different virtual or physical CPU of the receiving endpoint, and a packet placed in a queue is processed by the associated CPU. Accordingly, packet processing at the receiving endpoint is load balanced based on placing different packets in different queues based on the packets' header values hashing to different values. However, where all the L2VPN traffic between two endpoints is sent over the same IPsec tunnel between the same pair of VTIs, the values of the outer headers of the packets of the traffic may be the same, causing the packets to all be hashed to the same queue. Thus, a load balancer implemented on the receiving endpoint will select the same CPU for processing all L2VPN packets carried through the same IPsec tunnel, causing overloading of the selected CPU, and under-utilizing the remaining CPUs implemented on the receiving endpoint.

Accordingly, techniques for securely sending packets between endpoints are desirable.

It should be noted that the information included in the Background section herein is simply meant to provide a reference for the discussion of certain embodiments in the Detailed Description. None of the information included in this Background should be considered as an admission of prior art.

SUMMARY

The technology described herein provides a method for logical switch level load balancing. Embodiments include a method of securing communications with a peer gateway. The method generally includes establishing, at a virtual tunnel interface (VTI) of a local gateway, a plurality of security tunnels with the peer gateway by engaging with the peer gateway in a tunnel creation according to a security protocol. Each of the plurality of security tunnels is associated with a different set of one or more layer 2 segments and each of the plurality of security tunnels is associated with one or more security associations (SAs) with the peer gateway. The method generally includes receiving a packet, at the local gateway, via a first L2 segment. The method generally includes selecting one of the plurality of security tunnels and an SA associated with the selected security tunnel based on the L2 segment via which the packet was received. The method generally includes encrypting and encapsulating the packet based on the selected security tunnel and SA.

Further embodiments include a non-transitory computer-readable storage medium storing instructions that, when executed by a computer system, cause the computer system to perform the method set forth above, and a computer system including at least one processor and memory configured to carry out the method set forth above.

BRIEF DESCRIPTION OF THE DRAWINGS

FIG. 6 is an example table including a mapping of hash values of layer 2 identifiers (IDs) to IPsec tunnels, according to one or more embodiments.

FIG. 8 is an example table including a mapping of hash values of L2 IDs and VTI IDs to IPsec tunnels, according to one or more embodiments.

FIG. 9 is an example table including a mapping of hash values of L2 IDs and source and destination IP addresses to IPsec tunnels, according to one or more embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for logical switch level load balancing. In some embodiments, two endpoints within an L2VPN establish a plurality of IPsec tunnels between them. The plurality of IPsec tunnels are associated with a single VTI at each of the two endpoints. Each of the IPsec tunnels is associated with a different L2 segment, or with a different group of L2 segments. For example, each of the IPsec tunnels may be associated with an L2 ID, which is an identifier of a single L2 segment or a group of L2 segments. In certain aspects, an L2 ID comprises a VNI, a VLAN ID, a hash of a VNI, or a hash of a VLAN ID. In certain aspects, an L2 ID is mapped to one or more VNIs and/or VLAN IDs. In certain aspects, each L2 ID may be mapped or hashed to an SPI value of an SA associated with a particular IPsec tunnel, thereby associating each IPsec tunnel with one or more L2 segments. The SPI value may be referred to as a tunnel ID of the IPsec tunnel. The endpoints can send traffic over one of the IPsec tunnels based on the L2 ID associated with the traffic. Accordingly, each L2 segment or group of L2 segments can have a dedicated IPsec tunnel used for communication of traffic in the L2VPN. With a plurality of IPsec tunnels, the receiving endpoint can assign different CPUs to process traffic received over different IPsec tunnels, which avoids overloading of a single CPU.

For example, traffic sent over a particular IPsec tunnel includes in the packet headers the SPI value associated with the SA associated with the IPsec tunnel. Thus, traffic from different IPsec tunnels may hash to different processing queues at the receiving endpoint based on the different SPI values, thereby achieving load balancing at the receiving endpoint. Other examples of load balancing that may be used based on having dedicated IPsec tunnels may also be used, such as those described in U.S. Patent Application Publication No. 2020/0403922, which is hereby expressly incorporated by reference in its entirety.

Figure 1:
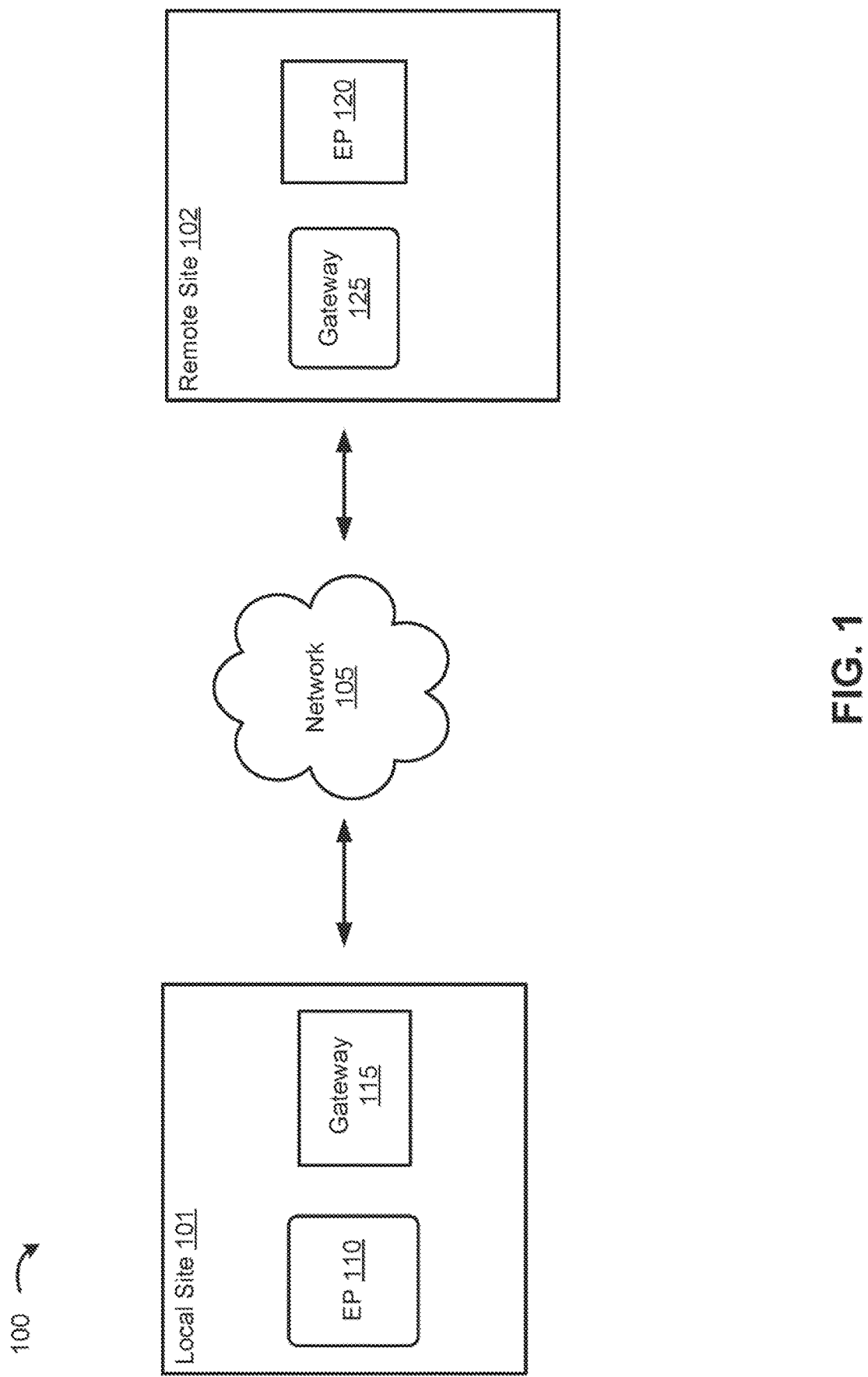
FIG. 1 depicts an example network, according to one or more embodiments.

FIG. 1 illustrates an example of a network environment 100, including a physical network 105, which connects a local site 101 to a remote site 102. As shown by FIG. 1, physical network 105 connects gateway 115 at local site 101 to a gateway 125 at remote site 102. A gateway may be a physical computing device or a VCI as further discussed herein. Gateway 115 and gateway 125 may be IPsec gateways. An IPsec gateway refers to a gateway that is configured with IPsec protocols to secure network traffic exchanged between itself and a peer IPsec gateway.

Gateway 115 and gateway 125 may connect endpoints (EPs), including EP 110 at local site 101 and EP 120 at remote site 102, for example, to stretch a layer 2 network across geographically distant sites. An EP refers generally to an originating EP ("source EP") or a terminating EP ("destination EP") of a flow of network packets, which can include one or more data packets passed from the source EP to the destination EP. In practice, an EP may be a physical computing device or a VCI, as further discussed herein.

EPs may communicate with or transmit data packets to other EPs via gateways, which are connected to multiple networks. For example, EP 110 may transmit a data packet to EP 120 in a secured fashion via gateway 115 and gateway 125, acting as a source gateway and a destination gateway, respectively. As described above, gateway 115 and gateway 125 implement IPsec protocols to secure communication between one another. In some embodiments, before any data can be securely transferred between EP 110 and EP 120, SAs are first established between gateway 115 and gateway 125. In some embodiments, the SAs may be established by gateway 115 and gateway 125 on behalf of EP 110 and EP 120.

In some embodiments, Internet Key Exchange (IKE) protocol is used to generate these SAs between gateway 115 and gateway 125. In some embodiments, SAs are established for inbound and outbound traffic between gateways 115 and gateway 125. Gateway 115 and gateway 125 establish an SA for traffic sent from gateway 115 (i.e., as a source gateway) to gateway 125 (i.e., as a destination gateway). Gateway 115 and gateway 125 establish another SA for traffic sent from gateway 125 (i.e., as the source gateway) to gateway 115 (i.e., as the destination gateway). The SAs include a mutually agreed-upon key, one or more security protocols, and/or a security parameter index (SPI) value for use in securely communicating packets between gateways 115 and 125, the packets being originated by a source EP 110 and destined for a destination EP 120, and vice versa.

The mutually agreed-upon key is used for encrypting packets originated by EP 110 and received at gateway 115 and for decrypting the packets at gateway 125, and vice versa. The one or more security protocols, described above, may be one or more IPsec security protocols such as Authentication Header (AH), Encapsulating Security Payload (ESP), etc. By establishing SAs among themselves, gateway 115 and gateway 125 effectively establish what may be referred to as an IPsec tunnel to protect data packets transmitted between gateways 115 and 125 for EP 110 and EP 120. In addition to a mutually agreed-upon key and security protocol, a SA includes an SPI value. In some embodiments, each SPI value is a value associated with a SA, which enables a gateway to distinguish among multiple active SAs. As an example, SPI values may be used to distinguish between the inbound and outbound SAs of a certain IPsec tunnel. As described in more detail with respect to FIGS. 3A-5, a plurality of IPsec tunnels can be established between a single pair of gateways, where the plurality of IPsec tunnels are associated with a single VTI at each of the gateways. Further, each of the plurality of IPsec tunnels is associated with different one or more L2 segments through association with an L2 ID of the one or more L2 segments.

Though certain embodiments are described herein with respect to the ESP security protocol, other suitable IPsec security protocols (e.g., AH protocol) alone or in combination with ESP, may be used in accordance with the embodiments described herein. In addition, while IPsec is a popular standard for securing VPN connections, the principles of the technology described herein may use other VPN security mechanisms.

Figure 2:
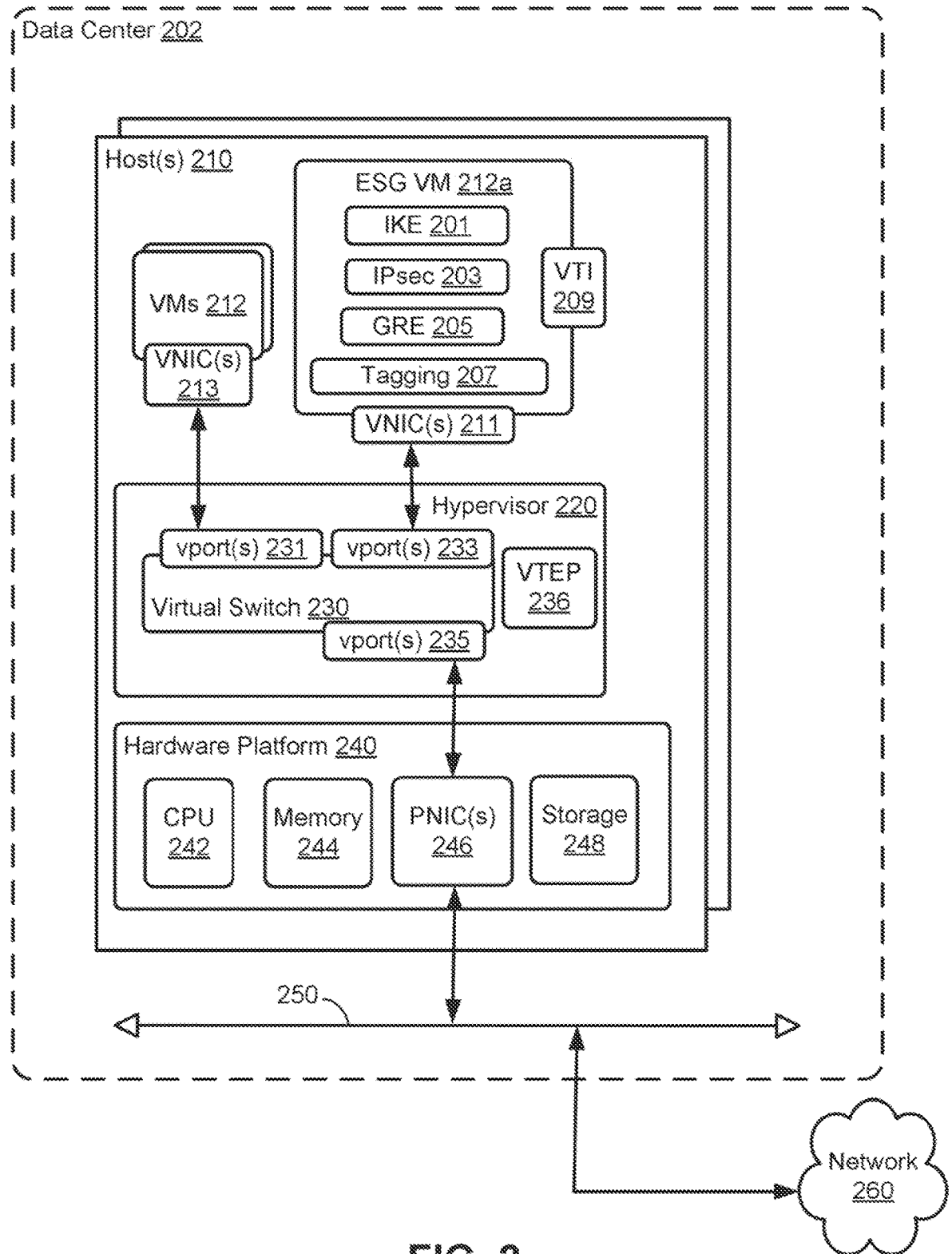
FIG. 2 depicts a block diagram of datacenter with a host and a gateway, according to one or more embodiments.

FIG. 2 depicts example physical and virtual network components in a network environment 200 in which embodiments of the present disclosure may be implemented. In some implementations, networking environment 200 may be a public cloud environment or an on-premises environment. Networking environment 200 includes a set of networked computing entities, and may implement a logical overlay network. As shown, networking environment 200 includes datacenter 202 and external network 260, which may be a wide area network such as the Internet.

Datacenter 202 includes hosts 210 and a data network 250. Host(s) 210 may be communicatively connected to data network 250, which is also referred to as a physical or "underlay" network. As used herein, the term "underlay" is synonymous with "physical" and refers to physical components of networking environment 200. As used herein, the term "overlay" is used synonymously with "logical" and refers to the logical network implemented at least partially within networking environment 200.

Host(s) 210 in datacenter 202 may be geographically co-located servers on the same rack or on different racks in any arbitrary location in datacenter 202. Host(s) 210 may be constructed on a server grade hardware platform 240, such as an x86 architecture platform. Hardware platform 240 of a host 210 may include components of a computing device such as one or more processors (CPUs) 242, system memory 244, one or more network interfaces (PNIC(s) 246), storage 248, and other components (not shown). CPU 242 is configured to execute instructions, for example, executable instructions that perform one or more operations described herein and that may be stored in memory 244 and/or in storage 248. Physical network interface cards (PNIC(s)) 246 enable host 210 to communicate with other devices via a physical network, such as data network 250, and/or external network 260. Host(s) 210 are configured to provide a virtualization layer, also referred to as a hypervisor 220, that abstracts processor, memory, storage, and networking resources of hardware platform 240 into multiple virtual machines, VMs 212. Although parts of the disclosure are described with reference to VMs, the teachings herein also apply to other types of VCIs, such as containers, Docker containers, data compute nodes, isolated user space instances, namespace containers, and the like.

Hypervisor 220 architecture may vary. Virtualization software can be installed as system level software directly on the server hardware (often referred to as "bare metal" installation) and be conceptually interposed between the physical hardware and the guest operating systems executing in the virtual machines. Alternatively, the virtualization software may conceptually run "on top of" a conventional host operating system in the server. In some implementations, hypervisor 220 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine.

Virtual switch 230 serves as a software-based interface between PNIC(s) 246 and VMs 212 running on host 210. As discussed, virtual switch 230 may in part implement one or more logical switches. As shown, virtual switch 230 has one or more virtual ports (vports) 235 connected to one or more PNICs 246 and virtual ports 231 and 233 connected to virtual NIC(s) of VMs 212. In some embodiments, one or more groups of vports of virtual switch 230 are assigned to a particular L2 segment, such that different groups of vports may be assigned to different L2 segments corresponding to different logical switches.

A virtual tunnel endpoint, VTEP 236, may be associated with software components, or it may itself, provide Layer 2 tunneling services for encapsulating egress packets from VMs 212 and decapsulating ingress packets to implement a logical overlay network to interconnect VMs 212 running on different hosts 210 as part of the same L2 logical overlay network, meaning as part of the same L2 network/broadcast domain in the logical overlay network. Tunneling services may be implemented using tunneling protocols such as virtual extensible local area network (VXLAN), Stateless Transport Tunneling (STT), Generic Network Virtualization Encapsulation (GENEVE), or Generic Routing Encapsulation (GRE). VTEP services may be implemented at each host 210 and/or at a gateway (e.g., such as a gateway 115).

In an SDDC, an edge services gateway (ESG) provides routing services and connectivity to networks that are external to the datacenter. In some embodiments, ESG VM 212a on host 210, is configured to perform the functions of a gateway. Alternatively, a gateway may be implemented as a separate host. ESG VM 212a may have a VTEP (not shown) configured to perform encapsulation and decapsulation of packets. As shown in FIG. 2, ESG VM 212a includes an IKE process 201, an IPsec process 203, a GRE process 205, a tagging process 207, and a VTI 209, that are discussed in more detail below. In some embodiments, ESG VM 212a is configured to perform GRE-over-IPsec encapsulation using GRE process 205 and IPsec process 203, as discussed in more detail below with respect to FIGS. 3A-5. Though certain aspects are described with respect to using GRE-over-IPsec encapsulation, other suitable tunneling or encapsulation protocols may similarly be used. In some embodiments, ESG VM 212a is configured to establish a plurality of IPsec tunnels using IKE process 201, each IPsec tunnel associated with a different one or more L2 segments, as discussed in more detail below with respect to FIGS. 3A-5. In some embodiments, ESG VM 212a selects an IPsec tunnel for sending a packet using tagging process 207 and IPsec process 203 as discussed in more detail below with respect to FIGS. 3A-9. In some embodiments, ESG VM 212a encrypts and encapsulates packets using IPsec process 203 as discussed in more detail below with respect to FIGS. 3A-5.

Figure 3A:
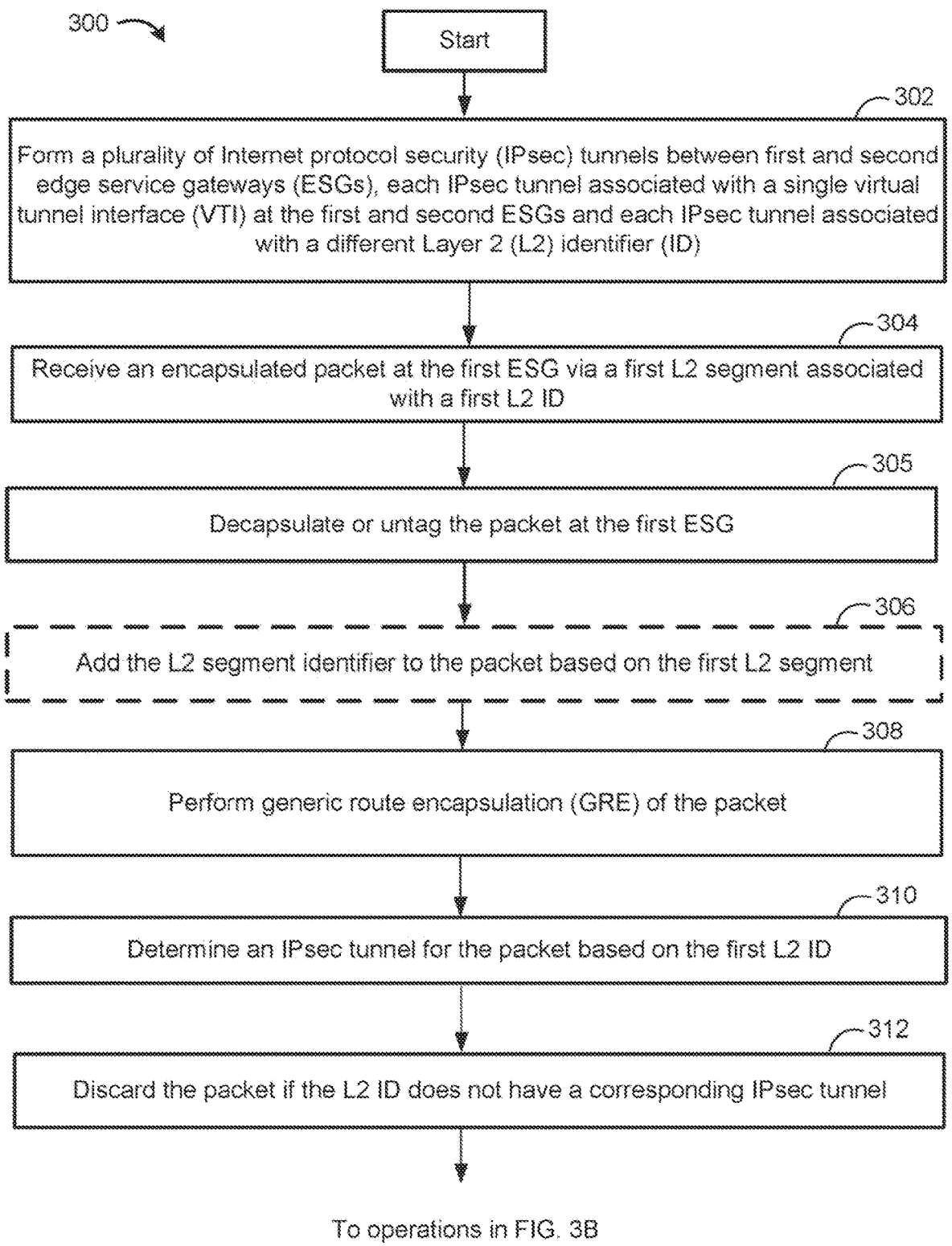
FIGS. 3A-3B depict a flowchart of example operations for logical switch level load balancing, according to one or more embodiments.
Figure 3B:
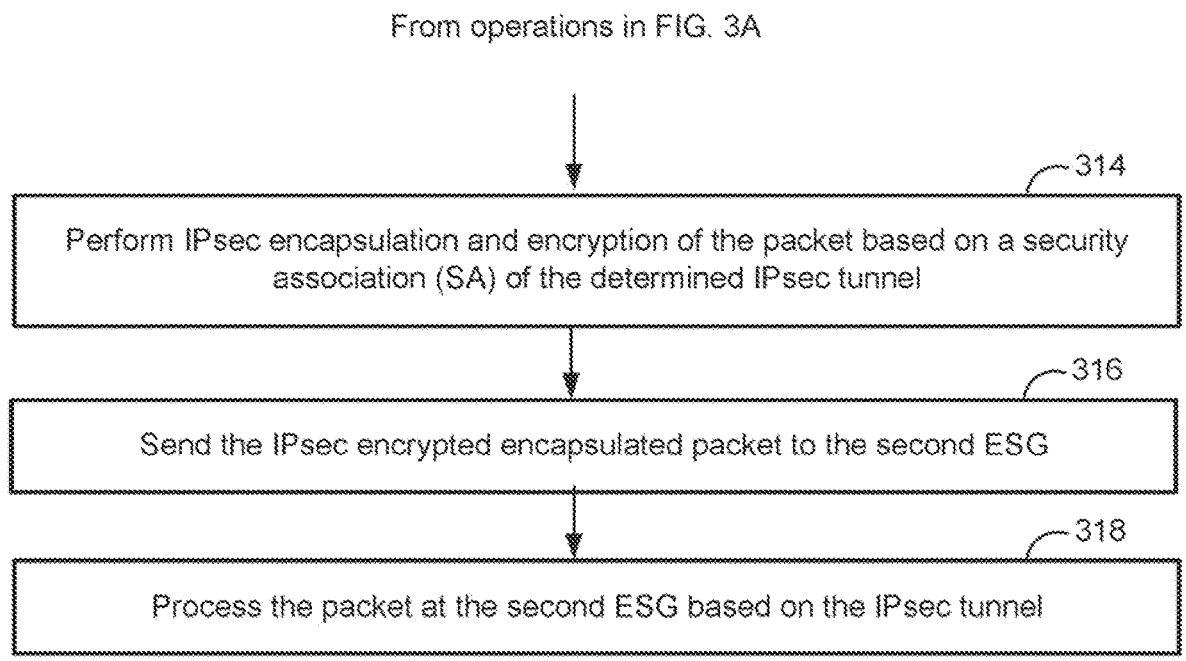

FIGS. 3A-3B depict a flowchart of example operations 300 for logical switch level load balancing, according to one or more embodiments.

Figure 4:
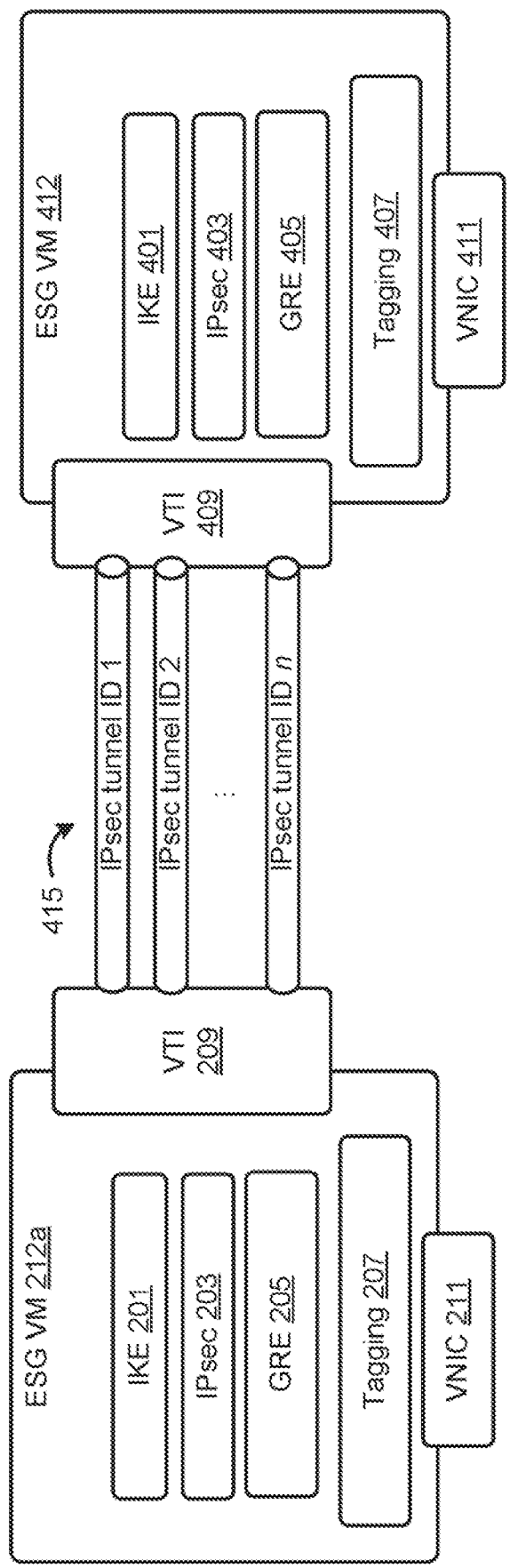
FIG. 4 depicts a block diagram of a gateway with multiple Internet Protocol security (IPsec) tunnels associated with a virtual tunnel interface (VTI) between the gateway and a peer gateway, according to one or more embodiments.

Operations 300 may begin, at block 302, by forming a plurality of IPsec tunnels between a first ESG and a second ESG, where each IPsec tunnel is associated with a single VTI at the first ESG and the second ESG, and each IPsec tunnel is associated with a different L2 ID. As shown in FIG. 4, ESG VM 212a and ESG VM 412 form multiple IPsec tunnels 415 between VTI 209 of ESG VM 212a and VTI 409 of ESG VM 412. IKE process 201 of ESG VM 212a may engage in an IKE negotiation process with IKE process 401 of ESG VM 412 to establish an IKE tunnel. IKE process 201 and IKE process 401 perform another negotiation to establish the multiple IPsec tunnels and SAs for the IPsec tunnels. In some embodiments, each IPsec tunnel is dedicated for a single L2 segment (with a corresponding L2 ID). In some embodiments, one or more of the IPsec tunnels is dedicated for a group of L2 segments (with a corresponding L2 ID of a group of L2 segments). Grouping L2 segments reduces the number of IPsec tunnels to be established.

ESG VM 212a and ESG VM 412 form an IPsec tunnel between them for an L2 segment that is extended to both ESG VM 212a and ESG VM 412. When an L2 segment is extended, the corresponding L2 ID is stored at the endpoint over which the L2 segment is extended. The L2 ID is stored prior to an SA negotiation for an IPsec tunnel associated with the L2 ID. In some embodiments, during the SA negotiation for an IPsec tunnel, ESG VM 212a sends a packet to ESG VM 412 specifying the L2 ID of the one or more L2 segments associated with the IPsec tunnel. In some embodiments, the packet is referred to as a traffic selector, which contains a payload that specifies selection criteria that associates an IPsec tunnel with a particular L2 ID. In some embodiments, the L2 ID associated with the IPsec tunnel is included as a new traffic selector type in the traffic selector payload. In some embodiments, the L2 ID is included in a security label field in the traffic selector payload.

If a particular L2 segment was not extended over ESG VM 412, or a software error occurs at ESG VM 412, then ESG VM 412 may not have a particular L2 ID stored. Accordingly, when ESG VM 412 receives a traffic selector with the L2 ID as part of the SA negotiation, the SA negotiation will fail for this IPsec tunnel and the IPsec tunnel is not created for the corresponding L2 segment(s). In the event of a failure, ESG VM 412 may send an IKE response message including an error code indicating the failure or the absence of a response from ESG VM 412 may indicate the failure. In some embodiments, when an IPsec tunnel is established between ESG VMs 212a and 412, peer ESGs will store a mapping of L2 IDs (or a combination of values including an L2 ID) to IPsec tunnel IDs (e.g., SPI values).

In some embodiments, the mapping is stored in a table, as discussed below with respect to FIGS. 6-9, which illustrate examples of different types of mappings.

At block 304, the first ESG receives a packet via a first L2 segment. For example, a packet 502 originating from a VM 212 may be received at ESG VM 212a via a particular L2 segment. VM 212 may insert one or more headers in the packet (e.g., protocol number, source address associated with VM 212, destination address associated with a destination endpoint (not shown in figures) reachable via ESG VM 412, and a source port and destination port for a layer 4 transport protocol. Based on the headers, host 210 determines to route the packet to ESG VM 212a. In particular, the packet is received at virtual port 231 of virtual switch 230 of host 210 via a VNIC 213 coupled to virtual port 231. In certain aspects, virtual port 231 is associated with a VLAN corresponding to the first L2 segment, and thus virtual switch 230 tags the packet with the VLAN ID of the first L2 segment. In certain aspects, virtual switch 230, in conjunction with VTEP 236, encapsulates the packet and includes a VNI of the first L2 segment in an outer header of the encapsulated packet. Host 210 then forwards the packet to ESG VM 212a.

At block 305, ESG VM 212a decapsulates or untags the packet, removing overlay network information to obtain the original packet 502. The decapsulation or untagging removes encapsulation headers and the VNI or VLAN ID information from the packet. The original packet 502 includes the payload and a header with the source destination address associated with VM 212 of the packet and destination address associated with the destination endpoint (not shown in figures).

Figure 5A:
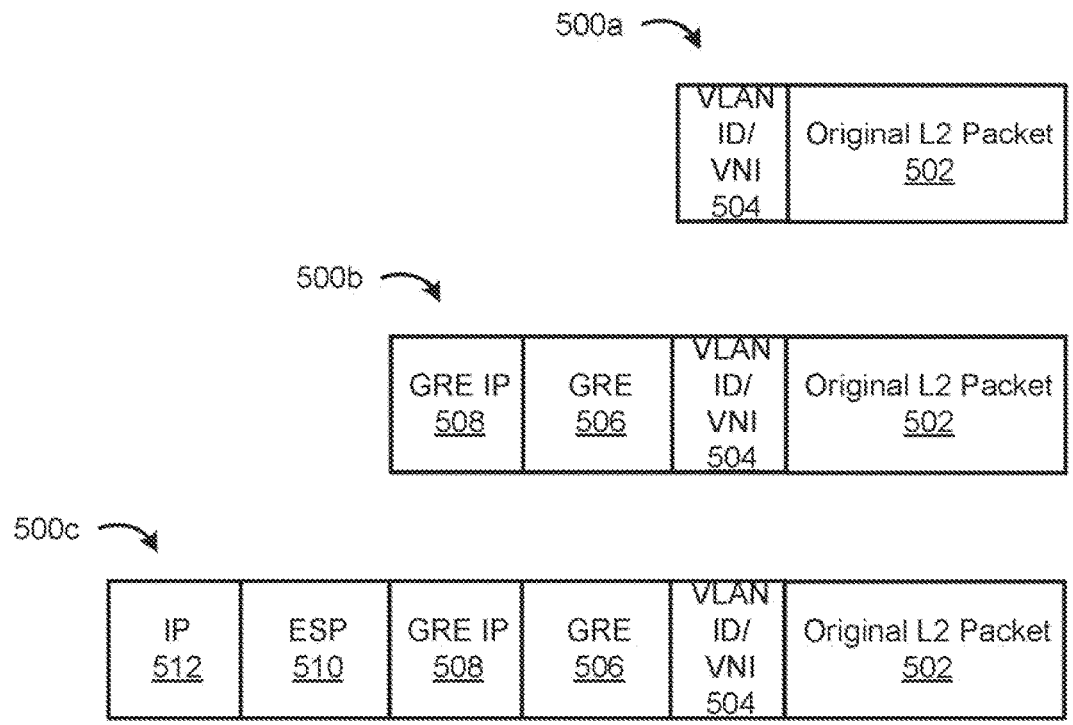
FIG. 5A depicts an example packet encapsulated with generic routing encapsulation (GRE)-over-IPsec, according to one or more embodiments.
Figure 5B:
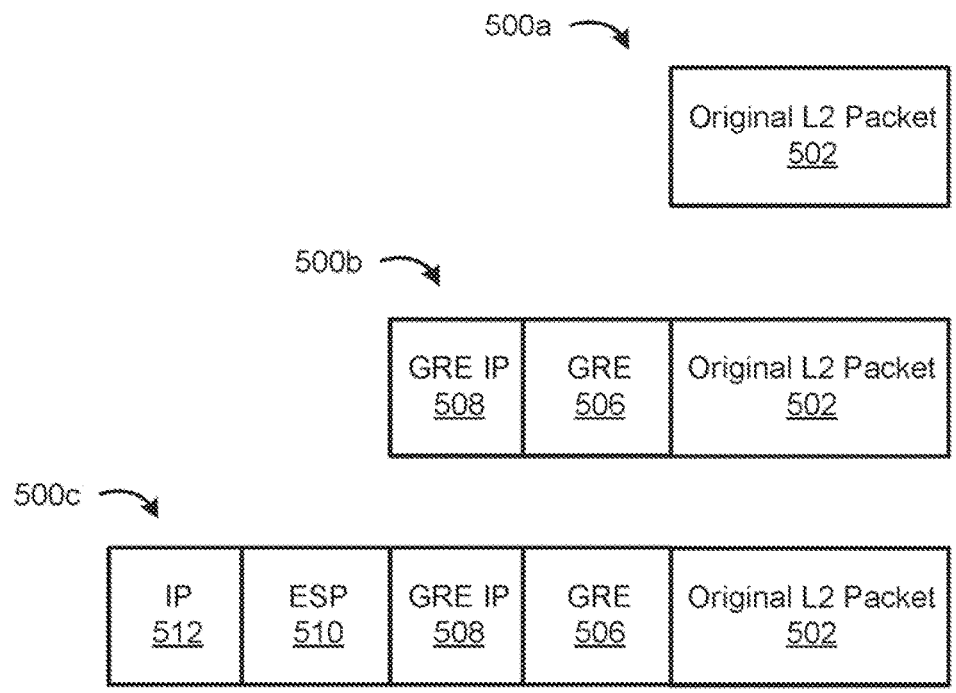
FIG. 5B depicts an example GRE-over-IPsec encapsulated packet with reduced overhead, according to one or more embodiments.

In some embodiments, when the packet is decapsulated or untagged, ESG VM 212a passes the VNI or VLAN ID to tagging process 207. At block 306, an identifier of the L2 segment, such as the VNI or VLAN ID, may be added to the packet based on the first L2 segment. The identifier may be the VNI or VLAN ID passed to the tagging process 207. As shown in FIG. 5A, tagging process 207 adds a header 504 with the VNI or VLAN ID to the original packet 502 to generate a packet 500a. In some embodiments, when each IPsec tunnel is dedicated for a single L2 segment, the tagging process can be skipped and the header 504 may not be added to the packet, as shown in FIG. 5B. Skipping the tagging process reduces the packet size and overhead. In particular, the receiving ESG VM 412 can determine the L2 segment of the packet based on the IPsec tunnel over which the packet is received, such as based on the SPI value included in the packet which maps to the L2 segment.

In some embodiments, at block 308, the virtual tunnel interface or another component of ESG VM 212a may encapsulate the packet using GRE encapsulation. GRE process 205 encapsulates packet 500a with a GRE header to generate a GRE encapsulated packet 500b. As shown in FIG. 5A and FIG. 5B, GRE process 205 adds GRE header 506 and GRE IP header 508 in packet 500a. GRE header 506 indicates the protocol type used by the GRE encapsulated packet 500b. GRE IP header 508 includes a source address and a destination address of the GRE tunnel, such as associated with ESG VM 212a and ESG VM 412, respectively.

At block 310, an IPsec tunnel is determined for the packet based on the first L2 ID associated with the first segment. IPsec process 203 can select the corresponding IPsec tunnel established for that L2 ID and select a corresponding SA. In some embodiments, such as where the L2 ID is unique across all the peers, IPsec process 203 determines the IPsec tunnel based on a hash of the L2 ID. IPsec process 203 may look up the hash in a table to find the corresponding IPsec tunnel ID, such as the SPI value, mapped to the L2 ID. FIG. 6 illustrates an example table 600, including mappings of L2 ID hash values to IPsec tunnels, according to one or more embodiments. As shown, table 600 includes hashes of L2 IDs to IPsec tunnels (e.g., to SPI values associated with the IPsec tunnels). As shown, in table 600, the different L2 IDs are mapped to different IPsec tunnels.

Figure 7:
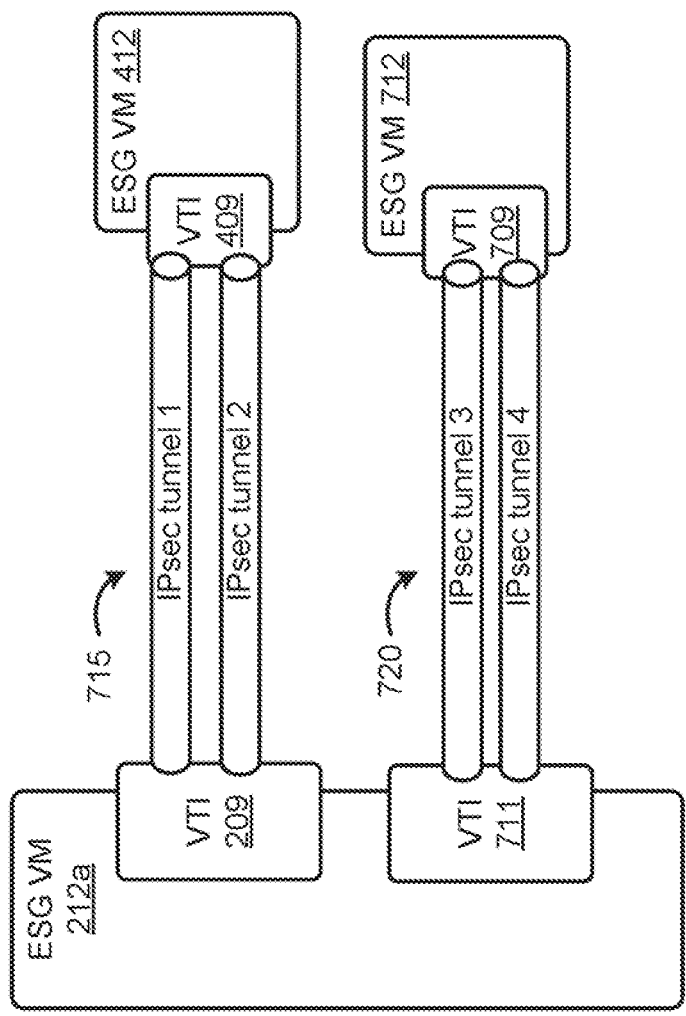
FIG. 7 depicts a block diagram of a gateway with multiple IPsec tunnels associated with each VTI between the gateway and two peer gateways, according to one or more embodiments.

In some embodiments, ESG VM 212*a* supports multiple L2VPN sessions, in which ESG VM 212*a* maintains L2VPN sessions with multiple peer gateways, e.g., ESG VM 412 and ESG VM 712, as shown in FIG. 7. In this case, an L2 segment stretched to both peer gateways may use a different IPsec tunnel depending on the L2VPN session. As shown in FIG. 7, ESG VM 212*a* uses IPsec tunnels 715 for an L2VPN session with ESG VM 412 and IPsec tunnels 720 for another L2VPN session with ESG VM 712 (having VTI 709).

In some embodiments, ESG VM 212*a* supports the multiple L2VPN sessions using different VTIs to communicate with the different peer gateways ESG VM 412 and ESG VM 712. As shown in FIG. 7, ESG VM 212*a* uses VTI 209 to communicate with ESG VM 412 and VTI 711 to communicate with ESG VM 712. In this case, ESG VM 212*a* may determine the IPsec tunnel to use for an L2 segment based on a hash of both the L2 ID and an ID of the VTI mapped to a corresponding IPsec tunnel, such as a universal unique identifier (UUID) of the VTI.

FIG. 8 is an example table 800 including a mapping of hash values of L2 IDs and VTI IDs to IPsec tunnels, according to one or more embodiments. As shown in table 800, for a packet associated with an L2VPN session with peer ESG VM 412, a packet received over a first L2 segment (L2 ID=A), a hash of VTI 209 and the L2 ID maps to a first IPsec tunnel (IPsec tunnel 1). For a packet associated with an L2VPN session with a different peer ESG VM 712 received over the same L2 segment, a hash of VTI 211 and the L2 ID maps to a different IP tunnel (IPsec tunnel 3).

In some embodiments, the L2 ID can be hashed with a GRE IP pairs (i.e., source and destination IP addresses), instead of the VTI ID. FIG. 9 is an example table 900 including a mapping of hash values of L2 IDs and source and/or destination IP addresses to IPsec tunnels, according to one or more embodiments. In the embodiment shown in FIG. 9, table 900 includes a mapping of hashes of L2 ID, GRE source IP address, and GRE destination IP address to IPsec tunnels. As shown, the hash for a first L2 ID (L2 ID=A), GRE source IP address, and GRE destination IP address maps to a first SPI for a first IPsec tunnel. The hashes for the same L2VPN session (e.g., the same GRE IP source and destination addresses) for different L2 segments (e.g., different L2 IDs) map to different IPsec tunnels. As shown, an L2 segment (e.g., L2 ID=A) can be mapped to a different IPsec tunnel (SPI=5) for a different L2VPN session (e.g., GRE source IP address=W, GRE destination IP address=Z).

Returning to operations 300 at FIGS. 3A-3B, when ESG VM 212*a* determines an IPsec tunnel for the packet based on the L2 ID, at block 310, ESG VM 212*a* may determine to drop the packet if an IPsec tunnel was not established for the L2 segment (e.g., the L2 ID may not be found in the hash table).

With a single IPsec tunnel established between peer endpoints for the L2VPN traffic, the source endpoint does not know if a particular L2 segment is extended to the destination endpoint. In some instances there may be a misconfiguration, such as a misconfigured L2 ID of an L2 segment established between peer endpoints in the L2 segment extended using L2VPN. For example, different L2 IDs may be configured at each of the peer endpoints for the same L2 segment. In the event such a misconfiguration occurs, the source endpoint will still send the packet over the IPsec tunnel, however, after reaching the destination endpoint, the destination endpoint will discard the packet because the L2 ID in the packet does not match the L2 ID configured at the destination endpoint. This causes additional overhead in sending the packet. Further, troubleshooting the misconfiguration is difficult, as it requires manually checking configuration settings and packet tracing on both endpoints.

With dedicated IPsec tunnels for each L2 segment, the source gateway, ESG VM 212*a*, knows when an L2 segment is extended to a destination gateway, e.g., ESG VM 412 or ESG VM 712, when there is an IPsec tunnel established for the L2 segment (e.g., when a hash for the corresponding L2 ID is mapped to an IPsec tunnel ID in the table). If an IPsec tunnel was not established for that L2 ID (e.g., due to a misconfiguration), then ESG VM 212*a* may discard the packet, at block 312, without sending the packet to the peer ESG VM. In some embodiments, if an IPsec tunnel was not established for an L2 ID, a default IPsec tunnel is used for sending the packet to peer ESG VM 412.

At block 314, the packet is encapsulated with an IPsec header and encrypted based on an SA of the determined IPsec tunnel. If a corresponding IPsec tunnel was established for the L2 ID, then IPsec process 203 encrypts the packet based on the SA established between ESG VM 212*a* and ESG VM 412 for the IPsec tunnel. For example, the IPsec process 203 encrypts the packet with a mutually agreed-upon key of the SA. IPsec process 203 inserts ESP header 510 (e.g., including an SPI value corresponding to the SA used to encrypt the packet) and IP header 512 over GRE encapsulated packet 500*b* as shown in FIG. 5A and FIG. 5B to generate an encapsulated ESP encrypted data packet 500*c*. IP header 512 includes a source address corresponding to the address of the IPsec gateway interface, such as the IP address of ESG VM 212*a* associated with VTI 209, and includes a destination address corresponding to the address of the IPsec peer gateway interface, such as the IP address of ESG VM 412 associated with VTI 409.

At block 316, the IPsec encrypted encapsulated packet is sent to the second ESG. For example, ESG VM 212*a* sends the encapsulated ESP encrypted data packet 500*c* to ESG VM 412 via VTI 209. At block 318, the second ESG process the packet based on the IPsec tunnel. For example, different processors of ESG VM 412 may be associated with different IPsec tunnels. ESG VM 412 may select a processor for the packet based on the IPsec tunnel over which the packet was received. The destination gateway, ESG VM 412, may then decrypt the encapsulated ESP encrypted data packet 500*c* and remove the GRE and L2 segment identifier (if included) headers to extract the original L2 packet 502. For example, ESG VM 412 may determine an SA (e.g., mutually agreed-upon key) to use to decrypt the encapsulated ESP encrypted data packet 500*c* based on the SPI value included in the ESP header 510. The SA may be associated with a security policy. Based on the security policy, IPsec process 403 determines if the packet was properly secured and, if so, ESG VM 412 forwards the decrypted and decapsulated original IP packet to, for example, a virtual switch to be forwarded to its final destination based on the destination IP address in the header of the original packet 502.

For inbound traffic, operations 300 can be performed by ESG VM 412 (e.g., IKE process 401, IPsec process 403, GRE process 405, tagging process 407, and VNIC 411) and ESG VM 212*a* decrypts and decapsulates an encapsulated ESP encrypted data packet received at VTI 209 from ESG VM 412.

The embodiments described herein provide a technical solution to a technical problem associated with sending secure traffic for an L2VPN, such as packet overhead, packet throughput, and troubleshooting misconfigurations. More specifically, implementing the embodiments herein allows for establishing multiple IPsec tunnels associated with a single VTI at each peer endpoint, allowing each L2 segment, or each group of L2 segments, to have a dedicated IPsec tunnel. The multiple IPsec tunnels provides logical switch level load balancing and higher throughput. The multiple IPsec tunnels provide redundancy and, hence, if one of the multiple IPsec tunnels fails, another IPsec tunnel can be used. Further, where each L2 segment has its own dedicated IPsec tunnel, the VLAN ID/VNI header does not need to be added in packets, thereby reducing packet overhead. In addition, the source gateway knows when an IPsec tunnel was not created for a particular L2 segment and, therefore, can discard a packet with the L2 ID of such an L2 segment without sending the packet to the peer gateway.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method, comprising:
    establishing, at a virtual tunnel interface (VTI) of a local gateway, a plurality of security tunnels with the peer gateway by engaging with the peer gateway in a tunnel creation according to a security protocol, wherein each of the plurality of security tunnels is associated with a different set of one or more layer 2 (L2) segments, and wherein each of the plurality of security tunnels is associated with one or more security associations (SAs) with the peer gateway, wherein each set of one or more L2 segments is associated with an L2 identifier (ID);
    after establishing each security tunnel, of the plurality of security tunnels, storing a hash of the L2 ID of the set of one or more L2 segments associated with the security tunnel, and a mapping of the hash to a tunnel ID of the security tunnel;
    receiving a packet, at the local gateway, via a first L2 segment;
    selecting one of the plurality of security tunnels and an SA associated with the selected security tunnel based on the L2 segment via which the packet was received; and
    encrypting and encapsulating the packet based on the selected security tunnel and SA.

2. The method of claim 1, wherein each of the plurality of security tunnels is associated with a single L2 segment, and wherein, after encrypting and encapsulating the packet, the packet does not contain an identifier of the L2 segment.

3. The method of claim 1, wherein each of the L2 IDs comprises one or more of the following:
    a virtual network identifier (VNI);
    a hash of a VNI;
    a virtual local area network (VLAN) ID; or
    a hash of a VLAN ID.

4. The method of claim 1, further comprising:
    encapsulating the packet with a generic routing encapsulation (GRE) header comprising a source Internet Protocol (IP) address corresponding to an IP address of the local gateway and a destination IP address corresponding to an IP address of the peer gateway,
    wherein storing the hash of the L2 ID comprises storing a hash of the L2 ID and one or more of the source IP address in the GRE header or the destination IP address in the GRE header.

5. The method of claim 1, further comprising:
    receiving a second packet via a second L2 segment;
    determining the second L2 segment is not associated with a security tunnel with the peer gateway; and
    discarding the second packet based on the determination.

6. The method of claim 1, further comprising:
    receiving a second packet via a second L2 segment;
    determining the second L2 segment is not associated with a security tunnel with the peer gateway; and
    selecting a default security tunnel based on the determination.

7. The method of claim 1, wherein a first security tunnel of the plurality of security tunnels is associated with a first set of L2 segments comprising a plurality of L2 segments.

8. The method of claim 1, further comprising:
    establishing, at a second VTI of the local gateway, a second plurality of security tunnels with a second peer gateway by engaging with the peer gateway in a tunnel creation according to a security protocol, wherein one or more of the second plurality of security tunnels is associated with the one or more L2 segments;
    receiving a second packet, at the local gateway, via the first L2 segment, wherein the second packet is for the second peer gateway;
    selecting one of the second plurality of security tunnels and an SA associated with the selected security tunnel based on the L2 segment via which the packet was received; and
    encrypting and encapsulating the packet based on the selected security tunnel and SA.

9. A system comprising:
    one or more processors; and
    at least one non-transitory computer-readable medium comprising instructions that, when executed by the one or more processors, cause the system to perform the operations comprising:
    establishing at a virtual tunnel interface (VTI) of a local gateway, a plurality of security tunnels with a peer gateway by engaging with the peer gateway in a tunnel creation according to a security protocol, wherein each of the plurality of security tunnels is associated with a different set of one or more layer 2 (L2) segments, and wherein each of the plurality of security tunnels is associated with one or more security associations (SAs) with the peer gateway, wherein each set of one or more L2 segments is associated with an L2 identifier (ID);
    after establishing each security tunnel, of the plurality of security tunnels, storing a hash of the L2 ID of the set of one or more L2 segments associated with the security tunnel, and a mapping of the hash to a tunnel ID of the security tunnel;
    receiving a packet, at the local gateway, via a first L2 segment;
    selecting one of the plurality of security tunnels and an SA associated with the selected security tunnel based on the L2 segment via which the packet was received; and
    encrypting and encapsulating the packet based on the selected security tunnel and SA.

10. The system of claim 9, wherein each of the plurality of security tunnels is associated with a single L2 segment, and wherein, after encrypting and encapsulating the packet, the packet does not contain an identifier of the L2 segment.

11. The system of claim 9, wherein each of the L2 IDs comprises one or more of the following:
    a virtual network identifier (VNI);
    a hash of a VNI;
    a virtual local area network (VLAN) ID; or
    a hash of a VLAN ID.

12. The system of claim 9, the operations further comprising:
    encapsulating the packet with a generic routing encapsulation (GRE) header comprising a source Internet Protocol (IP) address corresponding to an IP address of the local gateway and a destination IP address corresponding to an IP address of the peer gateway, wherein storing the hash of the L2 ID comprises storing the hash of the L2 ID and one or more of the source IP address in the GRE header or the destination IP address in the GRE header.

13. The system of claim 9, the operations further comprising:
 receiving a second packet via a second L2 segment;
 determining the second L2 segment is not associated with a security tunnel with the peer gateway; and
 discarding the second packet based on the determination.

14. The system of claim 9, the operations further comprising:
 receiving a second packet via a second L2 segment;
 determining the second L2 segment is not associated with a security tunnel with the peer gateway; and
 selecting a default security tunnel based on the determination.

15. The system of claim 9, wherein a first security tunnel of the plurality of security tunnels is associated with a first set of L2 segments comprising a plurality of L2 segments.

16. The system of claim 9, the one or more processors and the at least one memory further configured to:
 establishing at a second VTI of the local gateway, a second plurality of security tunnels with a second peer gateway by engaging with the peer gateway in a tunnel creation according to a security protocol, wherein one or more of the second plurality of security tunnels is associated with the one or more L2 segments;
 receiving a second packet, at the local gateway, via the first L2 segment, wherein the second packet is for the second peer gateway;
 selecting one of the second plurality of security tunnels and an SA associated with the selected security tunnel based on the L2 segment via which the packet was received; and
 encrypting and encapsulating the packet based on the selected security tunnel and SA.

17. A non-transitory computer-readable medium comprising instructions that, when executed by one or more processors of a computing system, cause the computing system to perform operations comprising:
 establishing, at a virtual tunnel interface (VTI) of a local gateway, a plurality of security tunnels with the peer gateway by engaging with the peer gateway in a tunnel creation according to a security protocol, wherein each of the plurality of security tunnels is associated with a different set of one or more layer 2 (L2) segments, and wherein each of the plurality of security tunnels is associated with one or more security associations (SAs) with the peer gateway, wherein each set of one or more L2 segments is associated with an L2 identifier (ID);
 after establishing each security tunnel, of the plurality of security tunnels, storing a hash of the L2 ID of the set of one or more L2 segments associated with the security tunnel, and a mapping of the hash to a tunnel ID of the security tunnel;
 receiving a packet, at the local gateway, via a first L2 segment;
 selecting one of the plurality of security tunnels and an SA associated with the selected security tunnel based on the L2 segment via which the packet was received; and
 encrypting and encapsulating the packet based on the selected security tunnel and SA.

18. The non-transitory computer-readable medium of claim 17, wherein each of the plurality of security tunnels is associated with a single L2 segment, and wherein, after encrypting and encapsulating the packet, the packet does not contain an identifier of the L2 segment.

19. The non-transitory computer-readable medium of claim 17, wherein each of the L2 IDs comprises one or more of the following:
 a virtual network identifier (VNI);
 a hash of a VNI;
 a virtual local area network (VLAN) ID; or
 a hash of a VLAN ID.

20. The non-transitory computer-readable medium of claim 17, the operations further comprising:
 encapsulating the packet with a generic routing encapsulation (GRE) header comprising a source Internet Protocol (IP) address corresponding to an IP address of the local gateway and a destination IP address corresponding to an IP address of the peer gateway,
 wherein storing the hash of the L2 ID comprises storing a hash of the L2 ID and one or more of the source IP address in the GRE header or the destination IP address in the GRE header.

* * * * *